June 28, 1955 O. KORNEI 2,711,945

MAGNETIC TRANSDUCER HEAD FOR HIGH FREQUENCY SIGNALS

Filed March 4, 1953 2 Sheets-Sheet 1

INVENTOR.
OTTO KORNEI
BY
Eber J. Hyde
ATTORNEY

June 28, 1955 O. KORNEI 2,711,945

MAGNETIC TRANSDUCER HEAD FOR HIGH FREQUENCY SIGNALS

Filed March 4, 1953 2 Sheets-Sheet 2

INVENTOR.
OTTO KORNEI
BY
Elber J. Hyde
ATTORNEY 2,711,945
Patented June 28, 1955

2,711,945

MAGNETIC TRANSDUCER HEAD FOR HIGH FREQUENCY SIGNALS

Otto Kornei, Cleveland Heights, Ohio, assignor, by mesne assignments, to Clevite Corporation, Cleveland, Ohio, a corporation of Ohio Application March 4, 1953, Serial No. 340,241
6 Claims. (Cl. 346—74)

This invention pertains to a magnetic transducer head and more particularly to a transducer head for magnetically recording and reproducing very high frequency signals.

At the present time efforts are being made to design magnetic recording equipment suitable for recording and subsequently reproducing very high frequency signals, for instance, television programs. For example, it is desirable to record signals of a few hundred thousand cycles per second on a record medium moving at the rate of 120 inches per second. If an A.-C. bias signal is to be used, it may be of the order of a million cycles per second or even higher.

The problems of extending the use of magnetic recording into the very high frequency range imposes upon the magnetic transducer head two requirements which have to be met simultaneously; first, the head must have high resolution, that is, it must be capable of recording or reproducing very short wave lengths. This property is determined mainly by the size of the effective gap length and is important in order to economize in the amount of the recording medium. The second requirement is that of low core losses in the upper frequency ranges; it is unrelated to the first one and is predominantly governed by the electrical and magnetic properties of the materials used in the construction of the head. Low losses are necessary in order to permit the generation of a sufficiently high magnetization in the core of the head before the extent of the losses becomes prohibitive. The core loss in a transducer head evidences itself by severe heating of the head in the recording process and by an undue deficiency of high frequencies in the playback process.

The present state of the art offers heads with either one of the two stipulated requirements. There are commercial heads available with excellent resolution, but effective only in the audio frequency range or slightly above. There are also heads with very low core loss, primarily designed and used for the recording of extremely short pulses. The cores of such heads are usually made of ferrites or similar materials. These heads, however, because of the physical properties of the special core materials used, do not have very good signal resolution.

It is an object of the present invention to provide a magnetic transducer head which has excellent signal resolution and very low core losses when operating in the very high frequency range.

Another object of the present invention is to provide a magnetic transducer head for operation in the very high frequency range which has far better signal resolution than any head with a non-metallic core heretofore developed for high frequency use.

A further object of the present invention is to provide a magnetic transducer head for operation in the very high frequency range which has much better flux distribution at the transducing gap than any head previously designed for operation at very high frequencies.

For a better understanding of the present invention, together with other and further objects thereof, reference is had to the following description taken in connection with the accompanying drawings, and its scope will be pointed out in the appended claims.

Fig. 1 of the drawings is a greatly enlarged isometric view showing the pole-tips of the prior art ferrite core magnetic transducer heads.

An aspect of the present invention is the provision of a magnetic transducer head, particularly adaptable for recording and reproducing signals in the very high frequency range, for example several hundred thousand cycles per second. The head is comprised of a core of non-metallic magnetically soft material such as powdered iron or, preferably, one of the numerous ferrites. This material defines a magnetic circuit, preferably closed, which includes at least one gap. Metallic pole-shoe means are intimately connected to the core on either side of the gap, defining a transducing gap for flux interlinkage with record material, and the core has coil means wrapped around it.

Ferrite materials are well known for having low electrical losses, especially eddy current losses, and for this reason have been very attractive for high frequency operation.

However, the very nature of the ferrite-type materials has made it impossible to obtain a transducing gap whose length is sufficiently short to obtain the extremely high resolution required. The ferrite materials have low losses, and they are hard and have excellent wearing qualities, but because of their brittle and granular structure, however, they can not be satisfactorily machined, cut, polished, or ground to form a transducing gap with two sharp, closely spaced, well defined edges. This shortcoming is of less importance when the transducer head is operated at a slight spacing from the surface of the recording medium, as it has been the practice in many high speed applications. The loss of resolution caused by the spacing itself is, then, so large that a greater gap length is not detrimental; in fact, it may even be desirable.

The described shortcoming of ferrite materials, on the other hand, is fatal to obtaining a transducing gap with a length of a fraction of a thousandth of an inch as is imperative for high resolution operation in direct contact with the record material.

Figure 1:
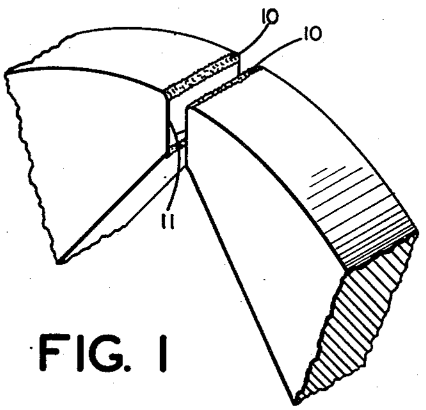

Fig. 1 is an enlarged view showing the pole-tips of a core of non-metallic magnetically soft material such as powdered iron or a ferrite. These materials, while very hard and very resistant to wear, crumble at their edges, as is shown by reference character 10 in Fig. 1. In effect, the crumbling of the outer edge of the pole-tips establishes a transducing gap which may be several times as long as the actual spacing between the confronting pole faces 11, thereby greatly reducing the resolution of the head. The crumbling away of the material at the edges of the gap thus very seriously reduces the high frequency limit which the head can handle for a given record member speed.

The present invention has overcome this difficulty for many applications by accepting a somewhat increased but localized loss in the head structure and by sacrificing the wearing qualities of the ferrite core, but otherwise retaining its low-loss advantages. The present invention thus provides a low-loss head which can be operated at several hundred thousand cycles per second with only slight localized heating, and which has an effective gap length and wearing qualities equal to the best prior art low frequency heads.

Figure 2:
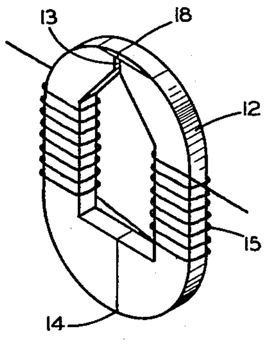
Fig. 2 is an isometric view showing an example of the transducer head of the present invention.

The transducer head of this invention is comprised of a core of non-metallic magnetically soft material 12, defining a magnetic circuit which includes at least one gap 13. As shown in Fig. 2, the core may define a magnetic circuit which is closed, except for the transducing gap 13 and a very narrow back-gap 14. Coil means 15 are wound about the core, preferably in two equal and symmetrically disposed coil sections.

The non-metallic magnetically soft material may be comprised of powdered iron, the individual particles of which are metallic but the formed core body of which is effectively non-metallic; it is preferred, however, to construct the core of any one of a wide variety of the ferrite materials. In order to have a very short transducing gap, there is secured to the core metallic high permeability pole-shoe means, preferably comprising two pole-shoes 16, 17 intimately connected to the core 12 on either side of the gap 13 in the core material, the pole-shoe means 16, 17 defining a very short gap 18 which is the recording-reproducing gap. During a recording or reproducing operation the record material moves in flux linkage relationship across the gap 18 closely adjacent to but preferably touching the pole-shoe means 16, 17. The pole-shoe means 16, 17 preferably are formed of a metallic material so that the transducing gap 18 may be made very short; for example, of the order of a quarter of a thousandth of an inch in length. The pole-shoe means 16, 17 may be secured in intimate contact with the core 12 by a very thin layer of adhesive material and the pole-shoe means preferably have an arcuate outer face, the curve of which is a continuation of the curved outer face of the core 12. This configuration facilitates smooth motion of the record material across and in close flux interlinkage with the transducing gap 18. As shown in the drawings the gap 13 in the core 12 is considerably wider than the gap 18 between the pole-shoe means 16, 17.

Figure 4:
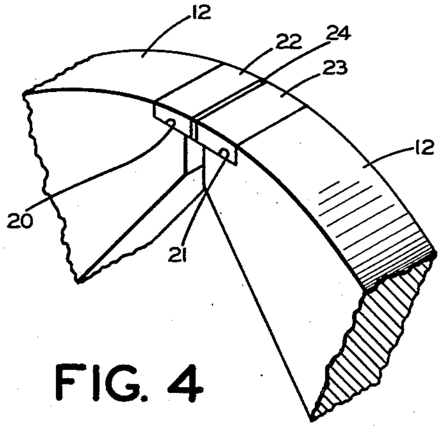
Figs. 4 and 5 show modifications of the invention illustrated in Fig. 3.

Fig. 4 illustrates another embodiment of the invention wherein the non-metallic core 12 has wide notches 20, 21 cut down into its two pole-tips. Metallic pole-shoe means 22, 23 having a very thin shim 24 secured between them are positioned in the two notches and held there by adhesive or the like. The actual transducing gap of the head shown in Fig. 4 is the gap 24.

Figure 5:
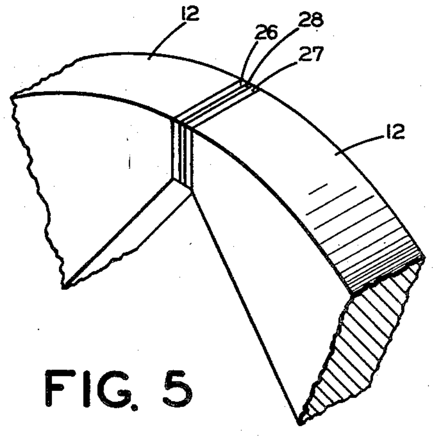

Fig. 5 shows another embodiment of the invention wherein the core 12 has a wide gap between its pole-tips. In this wide gap there is cemented pole-shoe means comprising two very thin plates 26, 27 of high permeability metallic material cemented on either side of a shim 28.

In each of the embodiments of the invention the electrical losses in the head are kept to a minimum, because almost the entire core circuit is formed of material having low loss, particularly low eddy current loss, and fine resolution is obtained because the transducing gap is defined by metallic material which can be machined, ground or polished to have as good a definition as any conventional transducer head.

The preferred method of assembling the heads is to make two similar half core sections, then to cement one of the pole shoes in proper position to each of the core halves. The gap defining face of each of the pole shoes is then ground or polished until the edge which, in the finished head, defines the transducing gap, is sharp.

Figure 3:
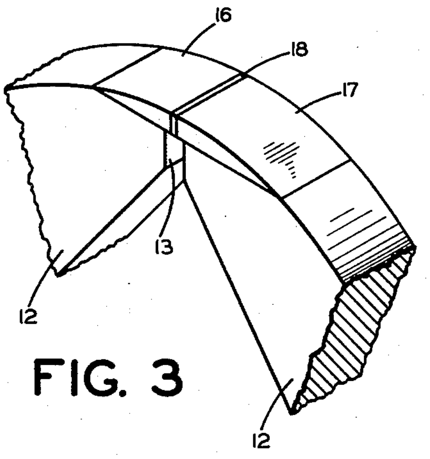
Fig. 3 is an enlarged isometric view of the pole-tip portion of the head shown in Fig. 2.

After the windings have been applied, the two core halves are assembled, with the desired spacer or shim between the confronting faces of the pole shoes. Suitable means such as clamps, spring means or embedding resins are then used in order to hold all parts securely in place. In a final operation the exposed pole shoes of the head are ground and lapped in order to provide a smooth contact surface with the record medium. This operation is also intended, in the case of Figs. 3 or 4, to reduce the thickness of the pole shoes to the preferred dimension of about two to ten mils.

Figure 6:
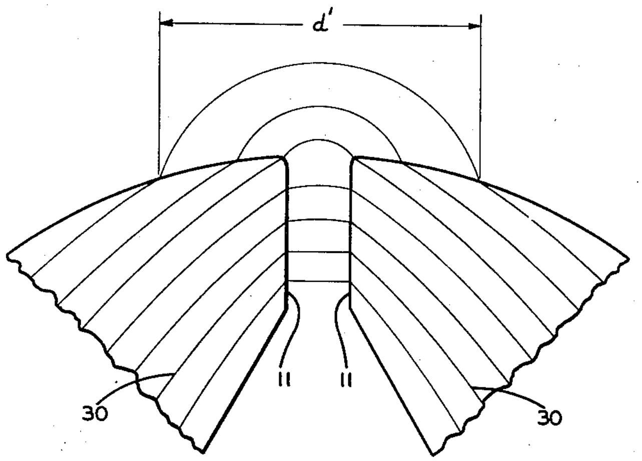
Fig. 6 is a schematic view of the magnetic flux passing across the pole-gap region of a prior art ferrite core transducer head.
Figure 7:
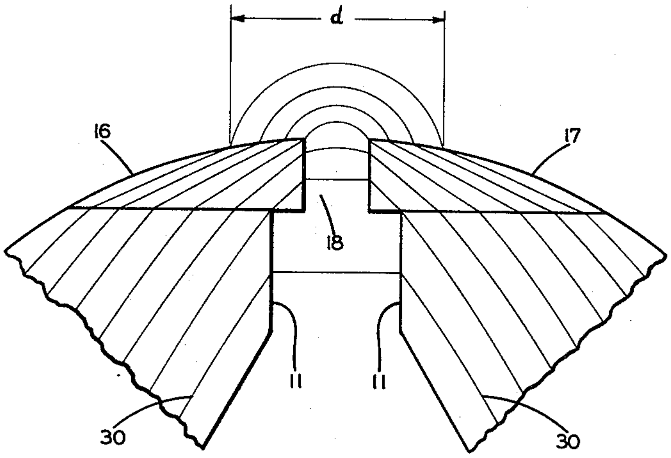
Fig. 7 is a schematic view showing the improved flux conditions of a transducer head embodying the present invention.

Fig. 6 schematically shows the distribution of flux at the transducing gap of a head having a core of non-metallic magnetically soft material such as a ferrite, and Fig. 7 schematically shows the distribution of flux at the transducing gap of a head embodying the present invention.

Fig. 6 shows flux lines 30 in the core material. Four of the illustrated flux lines bridge the gap between the closely spaced pole tips 11, 11 and are ineffective. The other three flux lines are effective to transduce a signal.

Fig. 7 shows that the pole tips 11, 11 of the ferrite core are spaced farther apart than the ferrite pole tips in Fig. 6. Consequently, there is only one flux line 31 extending between them. Metallic pole-shoe means 16, 17 have considerably higher permeability than the non-metallic core material, and because of this, the remaining six flux lines tend to stay in the pole-shoe means 16, 17. At the very narrow gap 18 only two flux lines are shown linking pole shoe 16 with pole shoe 17, the remaining four flux lines being available for transducing a signal.

Two important advantages obtained through use of the relatively high permeability pole-shoe means 16, 17 are that more flux is available for transducing a signal at the gap 18, and the flux is concentrated in a much shorter distance $d$ than is possible with the ferrite head shown in Fig. 6 where the effective flux extends throughout the distance $d'$. This means that the effective length of the transducing gap 18 in Fig. 7 is much shorter than the effective length of the transducing gap of the ferrite head even though the actual lengths of the gaps are the same.

Figure 8:
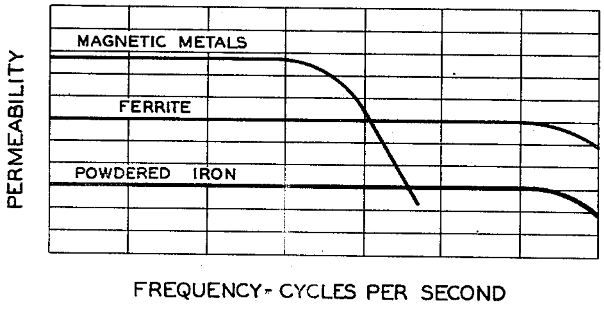
Fig. 8 is a schematic graph showing the improved performance of a transducer head having a non-metallic core over the performance of a transducer head having a metallic core.

Fig. 8 is a graph showing schematically the permeability of several transducer head core materials at different frequencies. It is to be noted that the permeability of the ferrite and powdered iron materials remain constant to very high frequencies while the permeability of a typical magnetic metal, because of its conductivity and the consequent eddy current loss, drops off rapidly beyond a relatively low frequency. It is for this reason that non-metallic cores of ferrite and powdered iron are preferred for high frequency operation to cores of metallic material.

Because the pole-shoe means 16, 17 are made of metallic material they will evidence heating at high frequencies. This, of course, is a disadvantage. The pole shoes, however, may be of the order of two to ten mils in thickness. It has been found that undue heating is prevented by the cooling effect of the record member which moves across and in contact with the pole-shoe means. Sufficient heat is transferred to the moving record member so that the slight rise in temperature is not objectionable. A further slight disadvantage is that the metallic pole-shoe means 16, 17 do not wear as well as the ferrite materials.

These disadvantages are more than offset by the sharp, well defined, narrow transducing gap which can be formed with the metallic pole-shoe means, and which can not be formed in a non-metallic core, and by the better distribution of flux obtained at the transducing gap of the head of the present invention.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A magnetic transducer head comprising: a core of non-metallic magnetically soft material defining a magnetic circuit which includes at least one gap, metallic pole-shoe means intimately connected to said core on either side of said gap defining a transducing gap for flux interlinkage with record material, and coil means around said core.

2. A magnetic transducer head comprising: a core of non-metallic magnetically soft material defining a magnetic circuit which includes at least one gap, metallic pole-shoe means having permeability higher than the permeability of said core intimately connected to said core on either side of said gap defining a transducing gap for flux interlinkage with record material, and coil means around said core.

3. A magnetic transducer head as set forth in claim 2, further characterized by said core being comprised of ferrite material.

4. A magnetic transducer head as set forth in claim 3, further characterized by said pole-shoe means comprising two pole shoes each having an outer arcuate face, said two arcuate faces together defining a smoothly curved path on either side of said transducing gap for supporting said record material during a transducing operation.

5. A magnetic transducer head comprising: a core of non-metallic magnetically soft material defining a magnetic circuit which includes at least one gap, metallic pole-shoe means having permeability higher than the permeability of said core intimately connected to said core or either side of said gap defining a transducing gap for flux interlinkage with record material which is narrow compared to the gap in said core, and coil means around said core.

6. A magnetic transducer head as set forth in claim 5, further characterized by said core being comprised of ferrite material.

References Cited in the file of this patent

UNITED STATES PATENTS

| | | |
|---|---|---|
| 2,361,752 | Eilenberger | Oct. 31, 1944 |
| 2,381,463 | Potter | Aug. 7, 1945 |
| 2,658,114 | Buhrendorf | Nov. 3, 1953 |